Jan. 25, 1949.  F. DEN  2,459,797
STEERING WHEEL FOR MOTOR VEHICLES
Filed Nov. 26, 1947  2 Sheets-Sheet 2

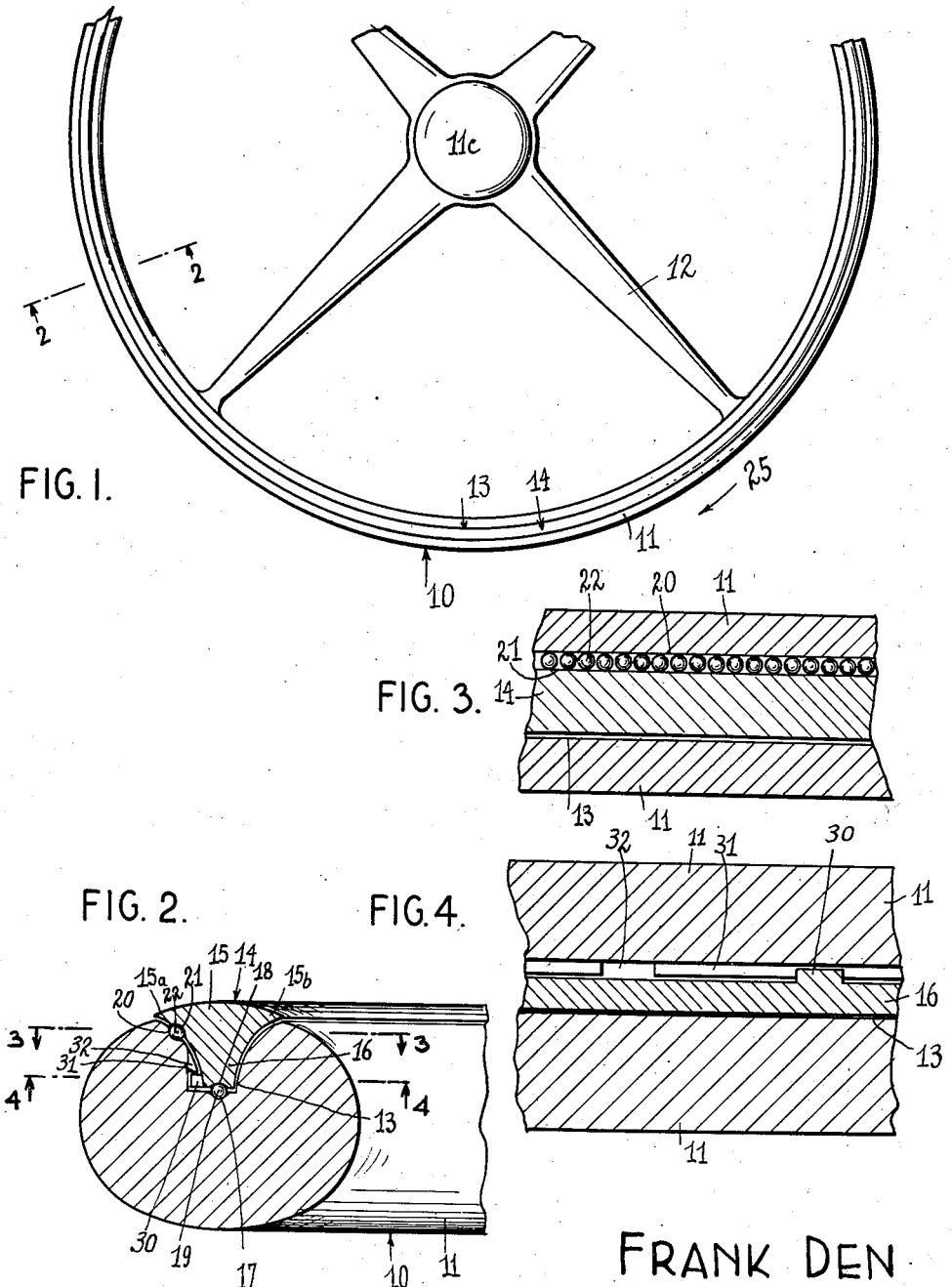

FRANK DEN,
INVENTOR.

By: *Julius J. Wittel,* his ATTORNEY.

Patented Jan. 25, 1949

2,459,797

UNITED STATES PATENT OFFICE 2,459,797

STEERING WHEEL FOR MOTOR VEHICLES

Frank Den, New York, N. Y.

Application November 26, 1947, Serial No. 788,265

8 Claims. (Cl. 74—552)

This invention relates to steering wheels for vehicles, like automobiles, trucks, and also farm implements, toys, motor boats, etc., and has for its main object to provide a device of this type, which will be more efficient, more convenient and safer to use than the steering wheels now employed.

A particular object of this invention is to provide a steering wheel which will permit the operator to change the position of his hand on the wheel, without taking the same off of it, that is, without entirely releasing or leaving the wheel.

Generally, it is desirable that the operator of a vehicle or other similar object having a steering wheel should be able to keep his hand on the wheel all the time, but at the same time, he should be enabled to change the position of his hand with relation to the wheel in an easier, more convenient and comfortable manner, than it is the case today. In addition, when a turn is needed, at present the operator has to turn the wheel to the direction desired, sometimes as far as his hands and arms will allow, whereupon he has to release the wheel and move his hands and arms back to a position where renewed further turning will be possible if that be desired. This requires considerable movements, in an awkward manner, and it is not only inconvenient, but in some cases it may even be dangerous.

An important object of my invention is to allow the hand of the operator to ride on the wheel into any position desired, without releasing the wheel, and, generally a normal usual position of his hand on the wheel being retained all the time.

Still another object of this invention is to eliminate the friction of the hand on the wheel as the hand seeks a new position thereon, whether a turn is needed or even at leisurely driving.

Further objects of this invention will be apparent as the specification of the same proceeds, or will be pointed out therein.

In the drawings forming a part of this specification and accompanying the same:

Fig. 1 is a plan view of an automobile steering wheel to which the preferred embodiment of my invention has been applied;

Fig. 2 is a sectional view thereof, on a larger scale, the section being taken on the line 2—2 of Fig. 1;

Fig. 3 is a fragmentary sectional view on the line 3—3 of Fig. 2, looking downwardly, and Fig. 4 is a similar view on the line 4—4 in said figure, but looking upwardly;

Figure 5:
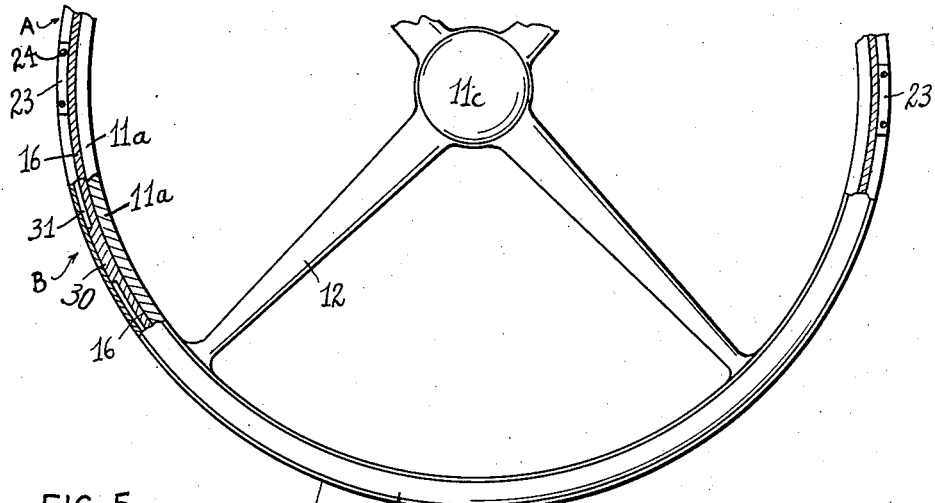
Fig. 5 is a plan view of a modification, portions of the same being broken away at various levels, as indicated at A and B.

Referring now to the drawings more in detail, by characters of reference, the numeral 10 indicates a steering wheel, in general, the same having the rim or wheel proper part 11, and the spokes 12, as usual. 11c indicates a steering post.

A groove 13 is provided in the rim 11, preferably at the top thereof, and a slidable ring, generally indicated by the numeral 14 is set into the groove 13, as best indicated in Fig. 2.

In the preferred embodiment shown, the ring 14 will have a wider upper portion 15, and a generally vertically placed lug portion 16 slidably fitting into the groove 13. The upper part 15 of the ring may have outer and inner projecting flange portions 15a and 15b, easily slidable over the respective top portions of the rim 11.

A ball race 17 is arranged at the bottom of the groove 13, and a corresponding race 18 is formed around the lower end of the lug 16, and bearing balls 19 are placed into the races 17 and 18, so that the ring member 14 is supported on said balls and may rotate in the groove 13 and over the rim 11 on said balls, in an anti-frictional manner.

I preferably provide a second ball race 20 in the outer side of the groove 13, and a corresponding ball race 21 in the respective side of the lug 16, and I arrange balls 22 in said second pair of races to further facilitate the easy, frictionless riding of my ring 14.

At one side, preferably the outer side of the groove 13, I provide a transverse groove 31 and a projection 30 is provided on the lug 16, adapted to ride in the groove 31 thereby to further steady the motion of the ring 14, but mainly to lock the same in the rim 11. An upward aperture 32 is also provided at a desired place for the groove 31 whereby the projection 30 may drop into the same when the device is assembled, as will be obvious.

As also will be understood, when it is desired to assemble the device, first the lower balls 19 will be placed into their race in the bottom of the groove 13, whereupon the upper balls 22 will be placed in their race in the rim 11, and now the sliding ring 14 may be dropped into its position shown in Fig. 2 by dropping the projection 30 through the upward aperture 32 into the transverse groove 31, and then turning the ring so that the projection 30 should lock the same in the rim 11. Preferably I may employ two or more projections 30 and entering apertures 32, in which case the arrangement of the projections on the ring 14 and the apertures in the rim 11 must be identical.

As it is well known in this art, and as has been mentioned hereinbefore, when a turn is needed, the driver has to rotate the wheel 10 sometimes to a large extent, so that he may be forced to move his hand back into a good gripping position twice, or even several times, on the wheel, which is a rather awkward and tiresome operation, and my invention mainly aims to provide a device whereby such turning of the steering wheel 10 may be executed in a more convenient, easier, and quicker manner, and whereby, generally, the driver may change the position of his hand on the wheel in a frictionless, easy manner.

So, for instance, if we assume that the driver desires to make a turn to the right, the steering wheel will be turned in the direction of arrow 25, at a large angle, the right hand of the driver gripping the right hand portion of the wheel as far as possible and the left hand gripping the wheel on the left side close to the driver's body, whereupon a turn of the nature indicated by arrow 25 will be executed, and if more turning is desired, the hands of the operator will again be moved to the said original position on the wheel, again turning it in the direction of arrow 25. During this operation, with devices now in use, the driver releases the wheel at the necessary moments, and moves his hand freely in the air to the next gripping position.

With my device this will not be necessary, but upon executing the first turn, as indicated by arrow 25, the driver's fingers may somewhat release the rim 11, and the upper part of his hand may ride on the ring 14 in a direction opposite to the arrow 25 until it again arrives to the necessary initial gripping position, whereupon his hand may, again, tightly close on the wheel, and he may execute a second turn in the direction of arrow 25, and, if necessary, this operation may be repeated several times, the driver's hands never leaving the steering wheel, and riding thereon in a frictionless manner.

Figure 6:
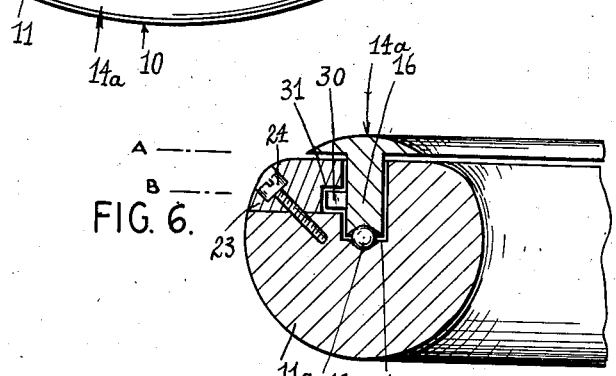
Fig. 6 is a sectional view thereof, the dot and dash lines therein indicating said levels.

In Figs. 5 and 6 I show a modification of my device, wherein only one system of bearing balls 19 are provided, at the bottom of the rotating ring, as before, and instead of the side bearing balls 22 an angular projection 30 only is provided on the side of the lug 16, and a corresponding angular slot 31 in the side of the groove 13, the projection fitting into said groove, but still being easily slidable therein.

It is obvious that, if necessary, a second groove and a second projection sliding therein, may be provided there on the inside of the lug 16 and the groove 13.

Various methods may be employed in the manufacture and assembling of this modification of my device. A preferred form I may employ is indicated in the figures, and according to this embodiment, the projection 30 will not be formed all around the circumference of the lug 16, only at predetermined places thereon, and for a limited length.

In the embodiment of Fig. 3, two removable sections 23, and two projections 30 are indicated at diagonally opposite places, so that the ring 14a may be dropped into its place on the rim 11a when the two closure pieces 23 are removed, by entering the projections 30 through openings provided by the removed pieces 23, whereupon the pieces may be returned and secured by screws 24.

Figure 7:
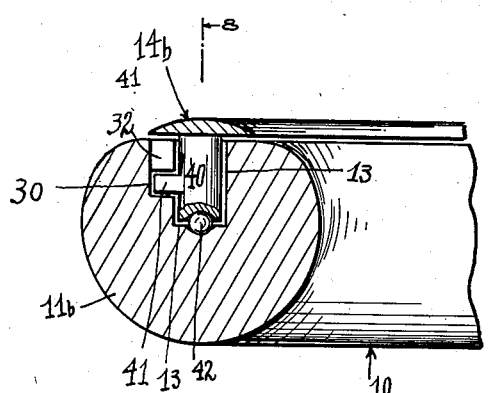
Figs. 7 and 8 are sectional views of still another modification.
Figure 8:
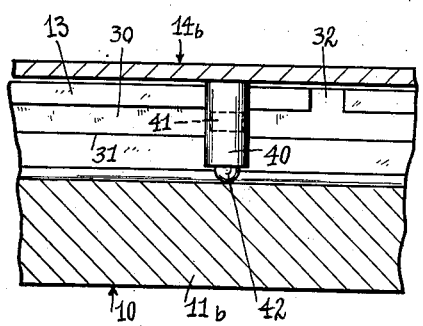

In Figs. 7 and 8 I illustrate still another modification of my invention. In this modification, the ring 14b will not have a continuous lug 16 all around its circumference, but it will have a desired number of legs 40 riding in the groove 13. A projection 41 is provided on each leg 40 riding in groove 30 in the rim as has been described in the modification of Figs. 5 and 6. A bearing ball 42 is set between the bottoms of the leg 40 and the groove 13 in appropriate holes of globular sections, or in a race in groove 13, as will be understood. Here, also, I may provide openings for each leg, so that the ring 14b may be set into its place, whereupon it may be locked therein through turning.

While I have shown preferred embodiments of my invention, it is to be understood that changes and variations may be resorted to in the elements, construction, and operation of my invention, and I reserve my rights to such changes and variations, as are within the spirit of this specification, and the scope of the claims hereunto appended.

What I claim as new and want to protect by Letters Patent of the United States is:

1. In an object, having a steering post and a steering wheel thereon concentric therewith, a turning of the steering wheel being adapted to directly influence and turn the post as desired, a ring rotatably set into the rim of the wheel and projecting beyond the rim to permit the hand of the driver to ride on the ring into a new position with relation to the wheel.

2. In a device, as set forth in claim 1, said ring being arranged on the top of the wheel.

3. In a device, as set forth in claim 1, a groove in the rim of the wheel, a lug on the ring slidable in said groove, a portion of the ring projecting over the rim of the wheel.

4. In a device, as set forth in claim 3, flange extensions at the two sides of the upper part of the ring overlapping the respective portions of the rim.

5. In a device, as set forth in claim 1, a groove in the rim of the wheel, a lug on the ring slidable in said groove, and bearing balls interposed between the bottom of the lug and of said groove, respectively.

6. In a device, as set forth in claim 1, a groove in the the rim of the wheel, a lug on the ring slidable in said groove, and bearing balls between the sides of the lug and of said groove.

7. In a device, as set forth in claim 1, a groove in the rim of the wheel, a lug on the ring slidable in said groove, a projection on the side of the lug, a channel in the side of the groove, said projection being slidable in said channel.

8. In a steering wheel for a motor vehicle, a groove provided in the top of the rim of the wheel, a ring over said top, and legs on the ring adapted to ride in said groove whereby the ring may rotate with relation to the rim.

FRANK DEN.

REFERENCES CITED

The following references are of record in the file of this patent:

UNITED STATES PATENTS

| Number | Name | Date |
| --- | --- | --- |
| 1,714,155 | Binkley | May 21, 1929 |
| 1,806,343 | Geyer | May 19, 1931 |